United States Patent
Guo et al.

(10) Patent No.: US 10,341,634 B2
(45) Date of Patent: Jul. 2, 2019

(54) METHOD AND APPARATUS FOR ACQUIRING IMAGE DISPARITY

(71) Applicant: SAMSUNG ELECTRONICS CO., LTD., Suwon-si (KR)

(72) Inventors: Ping Guo, Beijing (CN); Dongqing Zou, Beijing (CN); Qiang Wang, Beijing (CN); Baek Hwan Cho, Seoul (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 15/277,572

(22) Filed: Sep. 27, 2016

(65) Prior Publication Data

US 2017/0223332 A1   Aug. 3, 2017

(30) Foreign Application Priority Data

Jan. 29, 2016   (CN) .......................... 2016 1 0064279
Jul. 6, 2016    (KR) ........................ 10-2016-0085660

(51) Int. Cl.
*H04N 13/128*   (2018.01)
*H04N 13/122*   (2018.01)
*H04N 13/239*   (2018.01)
*H04N 13/00*    (2018.01)

(52) U.S. Cl.
CPC ......... *H04N 13/128* (2018.05); *H04N 13/122* (2018.05); *H04N 13/239* (2018.05); *H04N 2013/0081* (2013.01)

(58) Field of Classification Search
CPC ........... H04N 13/0022; H04N 13/0018; H04N 2013/0081
See application file for complete search history.

(56) References Cited

U.S. PATENT DOCUMENTS

| | | | |
|---|---|---|---|
| 7,856,142 B2 | 12/2010 | Ferman et al. | |
| 8,644,641 B2 | 2/2014 | Abraham et al. | |
| 8,897,545 B2 | 11/2014 | Schlosser et al. | |
| 9,204,127 B1 * | 12/2015 | Cole | H04N 13/20 |
| 2013/0222550 A1 | 8/2013 | Choi et al. | |

(Continued)

FOREIGN PATENT DOCUMENTS

| | | |
|---|---|---|
| KR | 10-0943635 B1 | 2/2010 |
| KR | 10-1088144 B1 | 12/2011 |
| KR | 10-2015-0104012 A | 9/2015 |

*Primary Examiner* — Anner N Holder
*Assistant Examiner* — Hesham K Abouzahra
(74) *Attorney, Agent, or Firm* — Sughrue Mion, PLLC

(57) ABSTRACT

A method and apparatus for acquiring an image disparity are provided. The method may include acquiring, from dynamic vision sensors, a first image having a first view of an object and a second image having a second view of the object; calculating a cost within a preset disparity range of an event of first image and a corresponding event of the second image; calculating an intermediate disparity of the event of the first image and an intermediate disparity of the event of the second image based on the cost; determining whether the event of the first image is a matched event based on the intermediate disparity of the event of the first image and the intermediate disparity of the event of the second image; and predicting optimal disparities of all events of the first image based on an intermediate disparity of the matched event of the first imaged.

19 Claims, 7 Drawing Sheets

(56) References Cited

U.S. PATENT DOCUMENTS

| | | | |
|---|---|---|---|
| 2014/0003704 A1* | 1/2014 | Liao | G06T 7/13 |
| | | | 382/154 |
| 2014/0125772 A1 | 5/2014 | Myokan et al. | |
| 2014/0293003 A1* | 10/2014 | Robert | H04N 13/183 |
| | | | 348/42 |
| 2015/0002627 A1 | 1/2015 | Wang et al. | |
| 2015/0249814 A1 | 9/2015 | Nanri et al. | |
| 2015/0269737 A1 | 9/2015 | Lam et al. | |

* cited by examiner

Nearest event in case of N = 1

Nearest event in case of N = 8

METHOD AND APPARATUS FOR ACQUIRING IMAGE DISPARITY

CROSS-REFERENCE TO RELATED APPLICATIONS

This application claims priority from Chinese Patent Application No. 201610064279.9, filed on Jan. 29, 2016 in the Chinese Intellectual Property Office, and Korean Patent Application No. 10-2016-0085660, filed on Jul. 6, 2016 in the Korean Intellectual Property Office, the disclosures of which are incorporated herein by reference in their entirety.

BACKGROUND

1. Field

Methods and apparatuses consistent with example embodiments relate to computer visual technology, and more particularly, to acquiring an image disparity.

2. Description of the Related Art

Current image disparity calculation technology performs a significant role in the field of many imaging applications such as target identification, three-dimensional (3D) image modeling, and driving assistance, for example. In recent years, the achievement of the image disparity calculation technology has been remarkable. There may be three types of image disparity calculation technologies based on a method of stereo matching a left image and a right image acquired by capturing the same scene at the same time using two sensors. Stereo matching may refer to searching for corresponding primitive descriptions in views from different perspectives in order to reconstruct 3D information.

1) Technology Based on Local Feature Similarity

This type of technology matches a pixel point of a left image to an optimal pixel of a right image by matching each pixel of the two images and pixels distributed in a near area range thereof.

2) Technology Based on Non-Local Feature Similarity

This type of technology detects a plurality of pixels having features similar to a feature of a pixel in an entire image space, calculates a cost matching matrix based on a similarity between pixels, and acquires a disparity of each pixel through a greedy algorithm.

3) Technology Based on Overall Feature Similarity

This type of technology primarily constructs a conditional random field of an image based on similarities between a pixel and all pixels in the image. This technology calculates a disparity of each pixel of the two images using local feature similarity technology, removes a match outlier through cross-validation of the left and right images, and propagates a matched disparity to other pixels using the conditional random field.

Since the three types of technologies are related to processing with respect to all pixels, and thus need to process all the pixels, a relatively long time for calculation due to a great complexity of calculation thereof may be required.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a method of acquiring an image disparity including: acquiring, from dynamic vision sensors, a first image having a first view of an object and a second image having a second view of the object; calculating a cost within a preset disparity range of an event of first image and a corresponding event of the second image; calculating an intermediate disparity of the event of the first image and an intermediate disparity of the event of the second image based on the cost; determining whether the event of the first image is a matched event based on the intermediate disparity of the event of the first image and the intermediate disparity of the event of the second image; and predicting optimal disparities of all events of the first image based on an intermediate disparity of the matched event of the first image.

The method may further include removing noise from the first image and the second image.

The calculating the cost may include calculating a feature of a pixel of the first image and the second image; and calculating the cost based on the feature of the pixel within a local range of a center point of the first and second images.

The determining may include verifying whether the intermediate disparity of the event of the first image is equal to the intermediate disparity of the corresponding event of the second image, determining the event of the first image to be the matched event when the intermediate disparity of the event of the first image is equal to the intermediate disparity of the corresponding event of the second image, and determining the event of the first image to be an unmatched event when the intermediate disparity of the event of the first image is different from the intermediate disparity of the corresponding event of the second image.

According to another aspect of another example embodiment, there is provided an apparatus for acquiring an image disparity including: a cost calculator configured to calculate a cost within a preset disparity range of an event of a first image and a corresponding event of a second image; a disparity calculator configured to calculate an intermediate disparity of the event of the first image and an intermediate disparity of the event of the second image based on the cost; a determiner configured to determine whether the event of the first image is a matched event based on the intermediate disparity of the event of the first image and the intermediate disparity of the event of the second image; and a disparity predictor configured to predict optimal disparities of all events of the first image based on an intermediate disparity of a matched event of the first image.

The cost calculator may include a noise remover configured to remove noise from the first image and the second image.

The cost calculator may include a feature calculator configured to calculate a feature of a pixel of first image and the second image; and a cost determiner configured to calculate the cost based on the feature of the pixel within a local range of a center point of the first and second images.

The determiner may include a verifier configured to verify whether the intermediate disparity of the event of the first image is equal to the intermediate disparity of the corresponding event of the second image, and an event determiner configured to determine the event of the first image to be the matched event when the verifier verifies that the intermediate disparity of the event of the first image is equal to the intermediate disparity of the corresponding event of the second image, and determine the event of the first image to be an unmatched event when the verifier verifies that the intermediate disparity of the event of the first image is different from the intermediate disparity of the corresponding event of the second image.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
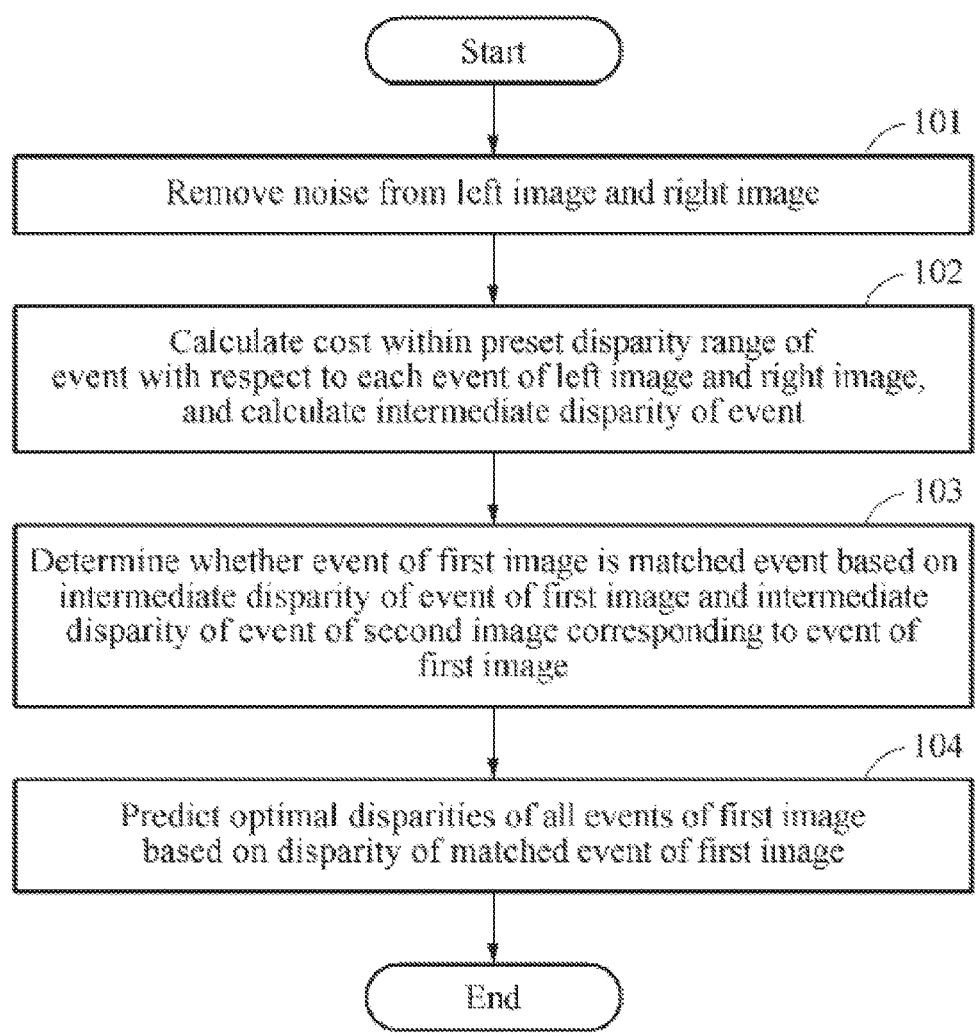
FIG. 1 is a flowchart illustrating a method of acquiring an image disparity according to an example embodiment.

Example embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In addition, the terms such as "unit", "-er (-or)", and "module" described in the specification refer to an element for performing at least one function or operation, and may be implemented in hardware, software, or the combination of hardware and software.

Various alterations and modifications may be made to the example embodiments, some of which will be illustrated in detail in the drawings and detailed description. The matters defined in the description, such as detailed construction and elements, are provided to assist in a comprehensive understanding of the example embodiments. However, it should be understood that these embodiments are not construed as limited to the illustrated forms and include all changes, equivalents or alternatives within the idea and the technical scope of this disclosure. It is apparent that the example embodiments can be practiced without those specifically defined matters. Also, well-known functions or constructions are not described in detail since they would obscure the description with unnecessary detail.

Specific structural or functional descriptions of example embodiments are merely disclosed as examples, and may be variously modified and implemented. Thus, the example embodiments are not limited, and it is intended that various modifications, equivalents, and alternatives are also covered within the scope of the present disclosure.

Though the present disclosure may be variously modified and have several embodiments, specific embodiments will be shown in drawings and be explained in detail. However, the present disclosure is not meant to be limited, but it is intended that various modifications, equivalents, and alternatives are also covered within the scope of the claims.

Although terms of "first", "second", etc. are used to explain various components, the components are not limited to such terms. These terms are used only to distinguish one component from another component. For example, a first component may be referred to as a second component, or similarly, the second component may be referred to as the first component.

When it is mentioned that one component is "connected" or "accessed" to another component, it may be understood that the one component is directly connected or accessed to another component or that still other component is interposed between the two components.

A singular expression includes a plural concept unless there is a contextually distinctive difference therebetween. Herein, the term "include" or "have" is intended to indicate that characteristics, numbers, steps, operations, components, elements, etc. disclosed in the specification or combinations thereof exist. As such, the term "include" or "have" should be understood that there are additional possibilities of one or more other characteristics, numbers, steps, operations, components, elements or combinations thereof.

A dynamic vision sensor may generate an event based on a change in intensity of lighting during capturing, and combine all events output during a predetermined period of time into a single image. In this example, a portion of pixels of the image may correspond to a single event, and another portion of the pixels of the image may not correspond to an event. The image generated by the dynamic vision sensor may have features as follows.

(1) The dynamic vision sensor may be a motion sensitive sensor configured to sense a frame event or an object boundary in response to the change in intensity of lighting and a relative motion reaching a preset threshold. Thus, content being captured may be described using a few events.

(2) An event generated by the dynamic vision sensor may be associated with the change in intensity of lighting during capturing. In response to the change in intensity of lighting during capturing being greater than the preset threshold, the dynamic vision sensor may describe a change in content being captured by generating a corresponding event. The dynamic vision sensor is a sensor sensitive to a change in intensity of lighting, and thus a lighting element may influence an image.

Hereinafter, a method of acquiring an image disparity that may capture images using two dynamic vision sensors at the same time and classify the images into a left image and a right image to acquire an image disparity.

FIG. 1 is a flowchart illustrating a method of acquiring an image disparity according to an example embodiment.

Referring to FIG. 1, the method of acquiring an image disparity may include the following operations.

A left image and a right image may be acquired using dynamic vision sensors. In operation 101, the method may remove noise from the left image and the right image.

In general, an event of an image generated by a dynamic vision sensor is generated based on a change in intensity of lighting. Thus, events may be distributed densely near boundaries and edges of a target being captured, and events distributed relatively sparsely may be regarded as noise.

Feature decomposition may be performed with respect to an image including noise. In this example, a relatively small eigenvalue may indicate that events are distributed relatively sparsely. Conversely, a relatively great eigenvalue may indicate that events are distributed relatively densely. Thus, a noise-removed image may be acquired by extracting and combining eigenvectors of several front eigenvalues that are greater than or equal to a preset value. Noise may be removed before a cost is calculated.

In operation 102, the method may calculate a cost within a preset disparity range of an event with respect to each event of the left image and the right image, and calculate an intermediate disparity of the event based on the cost. The cost may refer to a sum of all distances between one or more corresponding events in two different images (e.g., a left view image and a right view image).

In operation 103, the method may determine whether an event of a first image, for example, a reference image, is a matched event based on an intermediate disparity of the event of the first image and an intermediate disparity of a corresponding event of a second image. For example, whether the event of the first image is matched to the corresponding event of the second image may be determined. When the first image corresponds to the left image, the second image may correspond to the right image. When the first image corresponds to the right image, the second image may correspond to the left image.

Whether the event of the first image is a matched event or an unmatched event may be determined through cross-validation of a disparity between the left and right images, with respect to each event of the first image.

In operation 104, the method may predict optimal disparities of all events of the first image based on an intermediate disparity of the matched event of the first image.

In this example, a random field with respect to an overall optimal disparity of the first image may be generated based on Equation 1.

$$\hat{D} = \underset{\hat{D}}{\mathrm{argmin}}\left(\lambda \cdot \sum_{i=1}^{M}(\hat{d}_i * d_i) + (1-\lambda)\sum_{j=1}^{S}\left(\hat{d}_j - \sum_{m=1}^{K}w_{jm} \cdot d_m\right)\right) \quad \text{[Equation 1]}$$

In Equation 1, $\hat{D}$ denotes a set of optimal disparities of all events of a first image, $\lambda$ denotes a linear combination weight, M denotes a total number of matched events of the first image, $d_i$ denotes an intermediate disparity of a matched event i of the first image calculated based on a cost within a preset disparity range, $\hat{d}_i$ denotes an optimal disparity of the matched event i of the first image, S denotes a total number of events of the first image, $\hat{d}_j$ denotes an optimal disparity of an event j of the first image, K denotes a total number of matched events selected near the event j, $d_m$ denotes an intermediate disparity of a matched event m calculated based on the cost within the disparity range, among the selected matched events, $w_{jm}$ denotes a feature similarity between the event j and the matched event m, and denotes $\hat{D}$ that minimizes $$\underset{\hat{D}}{\mathrm{argmin}}\left(\lambda \cdot \sum_{i=1}^{M}(\hat{d}_i - d_i) + (1-\lambda)\sum_{j=1}^{S}\left(\hat{d}_j - \sum_{m=1}^{K}w_{jm} \cdot d_m\right)\right).$$

An optimal disparity of an unmatched event of the first image may be predicted based on a feature similarity between events. By predicting the optimal disparity based on an intermediate disparity of an event matched near the unmatched event, a smooth event disparity of the first image may be calculated. In general, spatially close events may have similar disparities.

Hereinafter, the operations of FIG. 1 will be described in detail.

Figure 2:
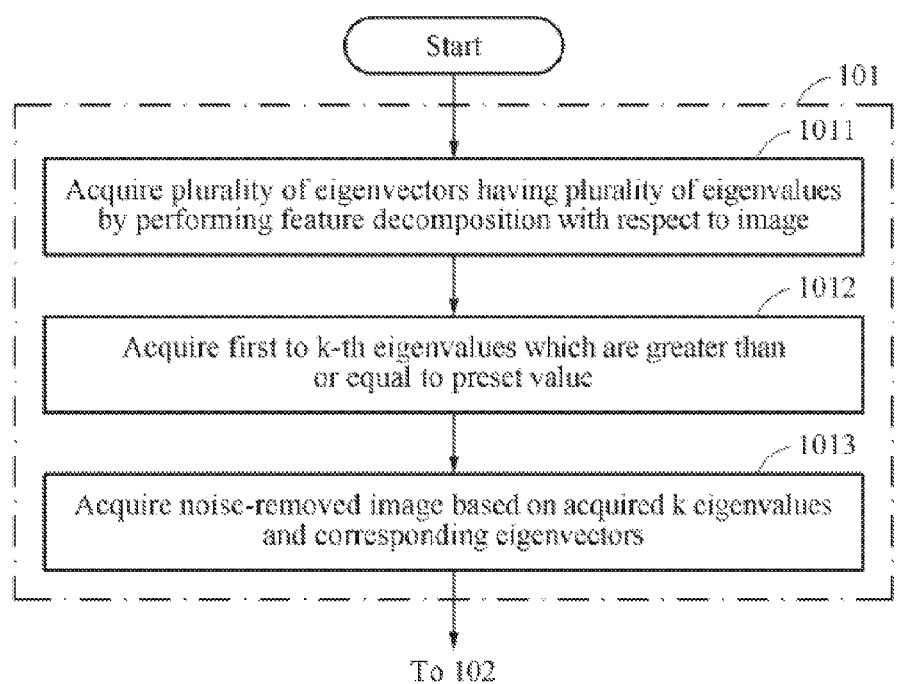
FIG. 2 is a flowchart illustrating an operation of removing noise from images in the method of FIG. 1.

FIG. 2 is a flowchart illustrating an operation of removing noise from images in the method of FIG. 1.

Referring to FIG. 2, the operation of removing noise from the images may include the following operations.

In operation 1011, the method may acquire $\{\delta_1 u_1 v_1^H, \delta_2 u_2 v_2^H, \ldots \delta_i u_i v_i^H, \ldots \delta_r u_r v_r^H\}$ by performing feature decomposition with respect to an image I. When e is defined as noise included in the image I and $I_0$ is defined as a noise-removed image, a relationship between the original image I and the noise-removed image $I_0$ may be defined as expressed by Equation 2.

$$I = I_0 + e = \sum_{i=1}^{r}\delta_i u_i v_i^H \quad \text{[Equation 2]}$$

In Equation 2, $\delta_i$ denotes an i-th eigenvalue, $\delta_1, \delta_2, \ldots, \delta_r$ denotes eigenvalues arranged in descending order, $u_i$ and $v_i^H$ denote eigenvectors orthogonal to each other, and r denotes a total number of the eigenvalues.

In operation 1012, the method may acquire first to k-th eigenvalues $\delta_1, \delta_2, \ldots, \delta_k$ which are greater than or equal to a preset value, among $\delta_1, \delta_2, \ldots, \delta_r$, k being less than r. Since $\delta_1, \delta_2, \ldots, \delta_r$ are arranged in descending order, the eigenvalues which are greater than or equal to the preset value may be the first to k-th eigenvalues $\delta_1, \delta_2, \ldots, \delta_k$.

In operation 1013, the method may acquire these noise-removed image $I_0$ based on the acquired k eigenvalues and corresponding eigenvectors, as expressed by Equation 3.

$$I_0 = \sum_{i=1}^{k}\delta_i u_i v_i^H \quad \text{[Equation 3]}$$

Figure 3:
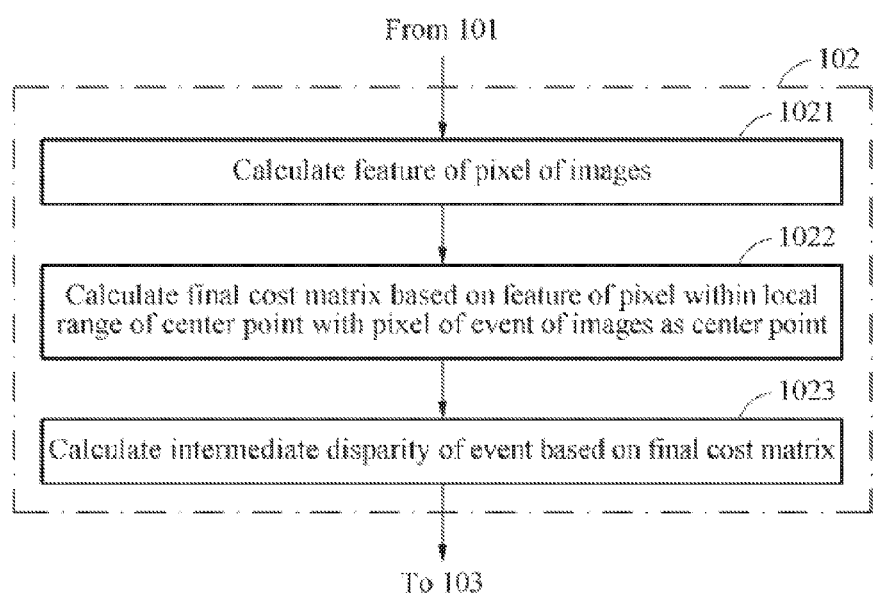
FIG. 3 is a flowchart illustrating an operation of calculating a cost within a preset disparity range of an event and an intermediate disparity in the method of FIG. 1.

FIG. 3 is a flowchart illustrating an operation of calculating a cost within a preset disparity range of an event and an intermediate disparity in the method of FIG. 1.

Referring to FIG. 3, in operation 1021, the method may calculate a feature of a pixel of the left image and the right image.

Figure 4A:
FIGS. 4A and 4B illustrate examples of searching for events near a pixel in N directions.
Figure 4B:

A feature of a pixel may be calculated by calculating a distance between the pixel and a recent event in a predetermined direction. An event at a nearest distance from a pixel may be determined among events in N directions, and a distance between the pixel and a recent event may be calculated, whereby N distances may be obtained to be used to describe the feature of the pixel. FIGS. 4A and 4B illustrate an example of N=1 and an example of N=8, respectively.

For example, a feature of a pixel (x,y) may be calculated based on Equation 4.

$$F_n(x, y) = \min_i(\text{abs}(x - i) \mid rotE_n(i, y) \neq 0) \quad \text{[Equation 4]}$$

In Equation 4, $F_n(x,y)$ denotes a feature of a pixel in an n-th direction, x and y denote an x-axial coordinate and a y-axial coordinate of the pixel, respectively, n denotes a value ranging from 1 to N, N denotes a total number of directions, i≠x is satisfied, $E_n(i,y)$ denotes a polarity of a pixel (i,y) near the pixel in the n-th direction, i denotes an x-axial coordinate of the pixel (i,y), rot denotes a function to rotate, abs denotes a function to obtain an absolute value, and min denotes a function to obtain a minimum value.

In operation 1022, the method may calculate the cost based on a feature of a pixel within a local range of a center point with a pixel of an event of the left image and the right image as the center point.

The cost may be a final cost matrix corresponding to the cost.

The final cost matrix may include a feature matching cost and a polarity matching cost.

Hereinafter, a method of calculating a feature matching cost, a method of calculating a polarity matching cost, and a method of calculating a final cost matrix using the feature matching cost and the polarity matching cost will be described.

(1) Feature Matching Cost

Under a condition that d denotes a disparity value within a preset disparity range, a feature matching cost $CF_n(x,y,d)$ of an event may be calculated based on Equation 5.

$$CF_n(x, y, d) = \sum_{(x', y') \in W(x,y)} [F_n(x' + d, y') - F_n(x', y')] \quad \text{[Equation 5]}$$

In Equation 5, x and y denote an x-axial coordinate and a y-axial coordinate of a pixel, respectively, and W(x,y) denotes a local range of a center point. The local range may be a single square range. (x',y') denotes an arbitrary pixel within w(x,y), N denotes a total number of directions, n denotes a value ranging from 1 to N, $F_n(x',y')$ denotes a feature of the arbitrary pixel (x',y') in an n-th direction, and $F_n(x'+d,y')$ denotes a feature of a pixel (x'+d,y') in the n-th direction. d denotes the disparity value within the disparity range. For example, the disparity range may have values from 1 to 100, that is, d=1, 2, ..., 100. Further, the disparity range may be preset based on a practical experience.

(2) Polarity Matching Cost

Under a condition that d denotes a disparity value within a preset disparity range, a polarity matching cost $CP((x,y,d)$ of an even may be calculated based on Equation 6.

$$CP(x,y,d) = [E(x+d,y) - E(x,y)]^2 \quad \text{[Equation 6]}$$

In Equation 6, x and y denote an x-axial coordinate and a y-axial coordinate of a pixel, respectively, E(x,y) denotes a polarity of a pixel (x,y) of an event, E(x+d,y) denotes a polarity of a pixel (x+d,y) and d denotes the disparity value within the disparity range. For example, the disparity range may have values from 1 to 100, that is, d=1, 2, ..., 100.

(3) Final Cost Matrix

Under a condition that d denotes a disparity value within a preset disparity range, a final cost matrix C(x,y,d) of an event may be calculated based on Equation 7.

$$C(x, y, d) = \alpha \cdot \sum_{n=1}^{N} CF_n(x, y, d) + (1 - \alpha) \cdot CP(x, y, d) \quad \text{[Equation 7]}$$

In Equation 7, α denotes a linear combination weight. By calculating an event of the left image and the right image, a cost matrix $C^l(x,y,d)$ of the left image and a cost matrix $C^r(x,y,d)$ of the right image may be calculated based on Equation 7.

In operation 1023, the method may calculate the intermediate disparity D(x,y) of the event based on the final cost matrix C(x,y,d) within the disparity range of the event.

In detail, the disparity D(x,y) of the event may be calculated based on the final cost matrix C(x,y,d) within the disparity range of the event using a winner-takes-all algorithm, as expressed by Equation 8.

$$D(x, y) = \underset{d}{\operatorname{argmin}} C(x, y, d) \quad \text{[Equation 8]}$$

In Equation 8, D(x,y) denotes an intermediate disparity of an event, x and y denote an x-axial coordinate and a y-axial coordinate of a pixel, respectively, C(x,y,d) denotes a final cost matrix of the event under the condition that d denotes the disparity value, d denotes an arbitrary disparity value within a preset disparity range, and $$\underset{d}{\operatorname{argmin}} C(x, y, d)$$

denotes d that minimizes C(x,y,d). In this example, by calculating an event of the left image and an event of the right image separately, an intermediate disparity $D^l(x,y)$ of the event of the left image and an intermediate disparity $D^r(x,y)$ of the event of the right image may be calculated based on Equation 8.

Figure 5:
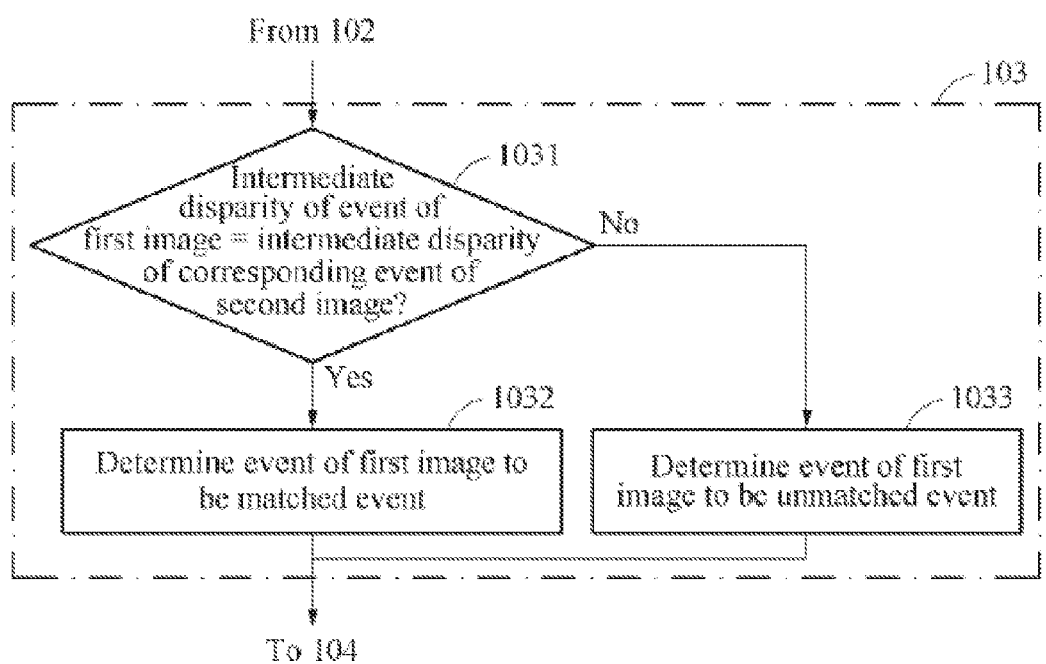
FIG. 5 is a flowchart illustrating an operation of determining whether an event is a matched event in the method of FIG. 1.

FIG. 5 is a flowchart illustrating an operation of determining whether an event is a matched event in the method of FIG. 1.

Referring to FIG. 5, in operation 1031, the method may verify whether the intermediate disparity $D^l(x,y)$ of the event of the first image is equal to the intermediate disparity $D^r(x+D^l(x,y), y)$ of the corresponding event of the second image.

When the two disparities are equal, the method may determine the event of the first image to be a matched event, in operation 1032. When the two disparities are not equal, the method may determine the event of the first image to be an unmatched event, in operation 1033.

x and y of $D^l(x,y)$ denote an x-axial coordinate and a y-axial coordinate of a pixel of an event of the first image, respectively, and x+$D^l(x,y)$ and Y of $D^r(x+D^l(x,y), y)$ denote an x-axial coordinate and a y-axial coordinate of a pixel of a corresponding event of the second image, respectively.

Which event of the first image is a matched event and which event of the first image is an unmatched event may be determined. When an event is a matched event, it may indicate that a calculated intermediate disparity of the event is accurate. Conversely, when an event is an unmatched event, it may indicate that a calculated intermediate disparity of the event includes an error, and thus the disparity of the event may need to be predicted again. In this example, the disparity of the event may be predicted again based on the intermediate disparity of the matched event of the first image.

In a method according to an example embodiment, a cost within a preset disparity range of an event may be calculated with respect to each event of a left image and a right image acquired using dynamic vision sensors, an intermediate disparity of the event may be calculated based on the cost, and it is determined whether an event of a first image is a matched event based on an intermediate disparity of the event of the first image and an intermediate disparity of a corresponding event of a second image. When the first image corresponds to the left image, the second image may correspond to the right image. When the first image corresponds to the right image, the second image may correspond to the left image. A disparity between corresponding events in the two different images may be calculated by predicting optimal disparities of all events of the first image based on an intermediate disparity of the matched event of the first image. In this example, an event, rather than a pixel, of an image may be processed. Since the number of events is less than the number of pixels, the method of acquiring an image disparity according to an exemplary embodiment may reduce an amount of time and a complexity of calculation required to process all pixels.

In a method according to another example embodiment, noise may be removed from a left image and a right image, and each event of the noise-removed left image and the noise-removed right image may be processed to acquire optimal disparities of all events of the first image. By effectively removing invalid events, that is, noise from an image, calculation may be performed with respect to valid events. Thus, a complexity of calculation may be reduced, an amount of time used for calculation may be reduced, and a work efficiency may improve.

In the method, a feature of a pixel of an image may be described effectively through a feature descriptor of the pixel, and a correspondence between events of left and right images may be calculated effectively. By predicting a method of optimal disparities of all events of a first image based on an intermediate disparity of a matched event of the first image, a smooth disparity of an event of the first image may be acquired, and a degree of disparity prediction precision may improve.

Table 1 shows experimental data of averages of disparity errors in all events of a first image calculated using Related Art 1, Related Art 2, and a method according to an example embodiment.

TABLE 1

|  | Related Art 1 | Related Art 2 | Example embodiment |
|---|---|---|---|
| Avgerr | 2.14 | 10.07 | 1.36 |

Avgerr denotes an average of disparity errors in all events of the first image, for example, in a unit of pixels. As shown in Table 1, when compared to Related Art 1 and Related Art 2, the method according to an example embodiment acquired the least average of disparity errors and the greatest degree of disparity prediction precision.

Hereinafter, an apparatus for acquiring an image disparity that may use the method described above will be provided.

Figure 6:
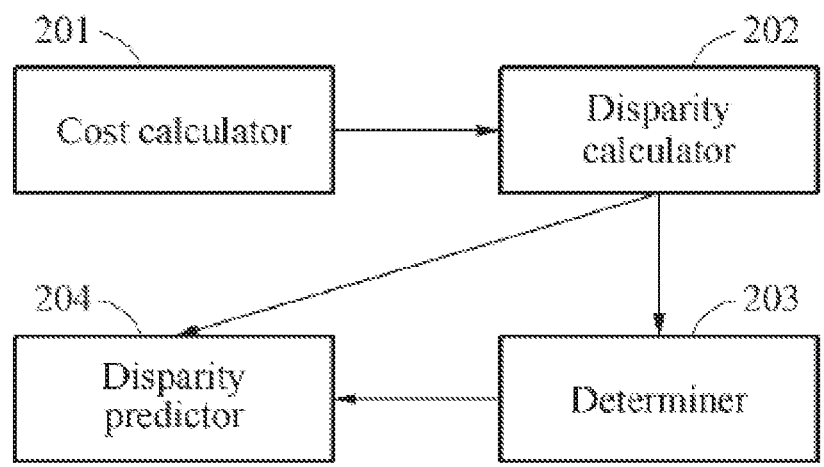
FIG. 6 is a block diagram illustrating an apparatus for acquiring an image disparity according to an example embodiment.

FIG. 6 is a block diagram illustrating an apparatus for acquiring an image disparity according to an example embodiment.

Referring to FIG. 6, the apparatus for acquiring an image disparity may include a cost calculator 201, a disparity calculator 202, a determiner 203, and a disparity predictor 204. The cost calculator 201, the disparity calculator 202, the determiner 203, and the disparity predictor 204 may be implemented by one or more processors.

The cost calculator 201 may calculate a cost within a preset disparity range of an event of a left image and a right image. The left image and the right image may be acquired using dynamic vision sensors.

The disparity calculator 202 may calculate an intermediate disparity of the event based on the cost.

The determiner 203 may determine whether an event of a first image is a matched event based on an intermediate disparity of the event of the first image and an intermediate disparity of a corresponding event of a second image. When the first image corresponds to the left image, the second image may correspond to the right image. When the first image corresponds to the right image, the second image may correspond to the left image.

The disparity predictor 204 may predict optimal disparities of all events of the first image based on an intermediate disparity of the matched event of the first image when the determiner 203 determines the matched event of the first image.

Figure 7:
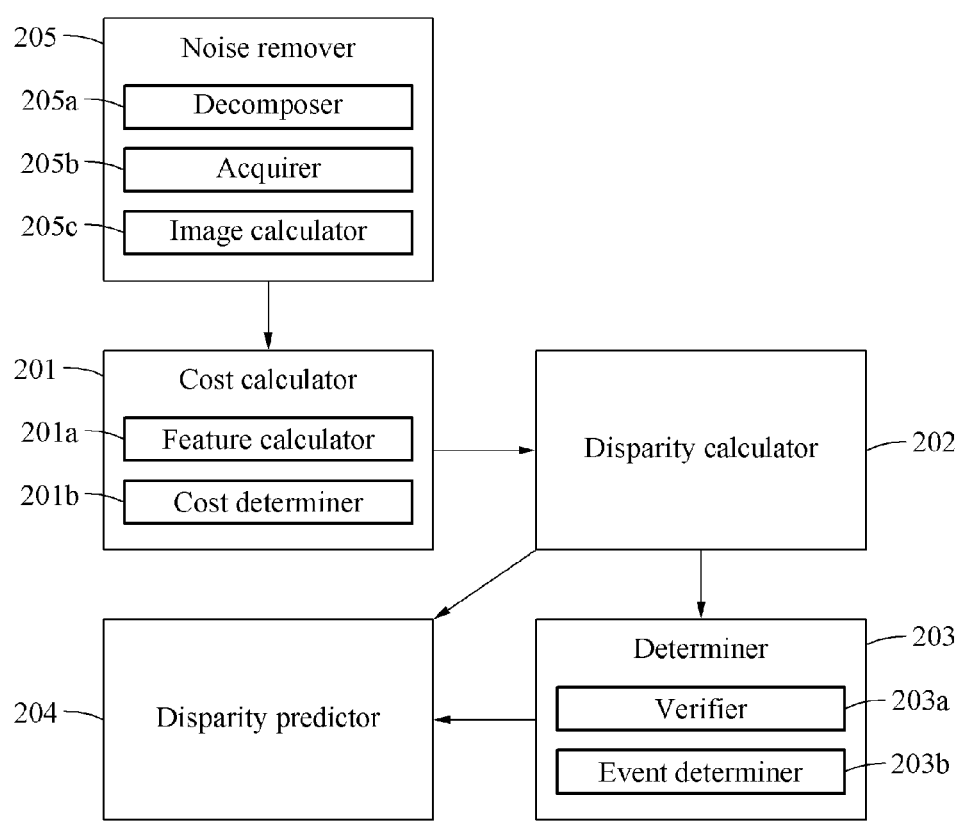
FIG. 7 is a block diagram illustrating an apparatus for acquiring an image disparity according to an example embodiment.

FIG. 7 is a block diagram illustrating an apparatus for acquiring an image disparity according to an example embodiment.

Referring to FIG. 7, the apparatus for acquiring an image disparity may further include a noise remover 205.

The noise remover 205 may remove noise from the left image and the right image before the cost calculator 201 calculates the cost within the disparity range of the event, with respect to each event of the left image and the right image.

The noise remover 205 may include a decomposer 205a, an acquirer 205b, and an image calculator 205c.

The decomposer 205a may acquire $\{\delta_1 u_1 v_1^H, \delta_2 u_2 v_2^H, \ldots \delta_i u_i v_i^H, \ldots \delta_r u_r v_r^H\}$ by performing feature decomposition with respect to an image, $\delta_i$ denoting an i-th eigenvalue, $\delta_1, \delta_2, \ldots, \delta_r$ denoting eigenvalues arranged in descending order, $u_i$ and $v_i^H$ denoting eigenvectors orthogonal to each other, and r denoting a total number of the eigenvalues.

The acquirer 205b may acquire first to k-th eigenvalues $\delta_1, \delta_2, \ldots, \delta_r$ which are greater than or equal to a preset value, among $\delta_1, \delta_2, \ldots, \delta_r$, with respect to k satisfying k<r.

The image calculator 205c may acquire a noise-removed image $I_0$ based on an equation $$I_0 = \sum_{i=1}^{k} \delta_i u_i v_i^H.$$

The cost calculator 201 may include a feature calculator 201a and a cost determiner 201b.

The feature calculator 201a may calculate a feature of a pixel of an image. The cost determiner 201b may calculate the cost within a preset disparity range based on a feature of a pixel within a local range of a center point with a pixel of an event of the image as the center point.

The feature calculator may calculate a feature of a pixel (x,y) of an image based on Equation 9.

$$F_n(x, y) = \min_i(\text{abs}(x - i) \mid rotE_n(i, y) \neq 0) \qquad \text{[Equation 9]}$$

In Equation 9, denotes a feature of a pixel in an n-th direction, x and y denote an x-axial coordinate and a y-axial coordinate of the pixel (x,y), respectively, n denotes a value ranging from 1 to N, N denotes a total number of directions, i≠x is satisfied, $E_n(i,y)$ denotes a polarity of a pixel (i,y) near the pixel in the n-th direction, i denotes an x-axial coordinate of the pixel (i,y), rot denotes a function to rotate, abs denotes a function to obtain an absolute value, and min denotes a function to obtain a minimum value.

The cost determiner may calculate a cost of the event based on Equation 10, under a condition that d denotes a disparity value within a preset disparity range. The cost of the event may be a final cost matrix C(x,y,d) corresponding to the cost.

$$\begin{cases} C(x, y, d) = \alpha \cdot \sum_{n=1}^{N} CF_n(x, y, d) + (1 - \alpha) \cdot CP(x, y, d) \\ CF_n(x, y, d) = \sum_{(x', y') \in W(x,y)} [F_n(x' + d, y') - F_n(x', y')] \\ CP(x, y, d) = [E(x + d, y) - E(x, y)]^2 \end{cases}$$ [Equation 10]

In Equation 10, d denotes a disparity value within a preset disparity range, C(x,y,d) denotes a final cost matrix, $CF_n$(x,y,d) denotes a feature matching cost, CP(x,y,d) denotes a polarity matching cost, α denotes a linear combination weight, x and y denote an x-axial coordinate and a y-axial coordinate of a pixel, (x,y), respectively, W(x,y) denotes a local range of a center point, (x',y') denotes an arbitrary pixel within W(x,y), N denotes a total number of directions, n denotes a value ranging from 1 to N, $F_n$(x',y') denotes a feature of the arbitrary pixel (x',y') in an n-th direction, $F_n$(x'+d,y') denotes a feature of a pixel (x'+d,y') in the n-th direction, E(x,y) denotes a polarity of the pixel (x,y), and E(x+d,y) denotes a polarity of a pixel (x+d,y).

The disparity calculator 202 may calculate the intermediate disparity D(x,y) of the event based on Equation 11.

$$D(x, y) = \underset{d}{\mathrm{argmin}} C(x, y, d)$$ [Equation 11]

In Equation 11, x and y denote an x-axial coordinate and a y-axial coordinate of a pixel, respectively, d denotes a disparity value within a preset disparity range, C(x,y,d) denotes a final cost matrix, and $$\underset{d}{\mathrm{argmin}} C(x, y, d)$$

denotes d that minimizes C(x,y,d).

The determiner 203 may include a verifier 203a and an event determiner 203b.

The verifier 203a may verify whether the intermediate disparity $D^l$(x,y) of the event of the first image is equal to the intermediate disparity $D^r$(x+$D^l$(x,y), y) of the corresponding event of the second image. x and y of $D^l$(x,y) denote an x-axial coordinate and a y-axial coordinate of a pixel of an event of the first image, respectively, and x+$D^l$(x,y) and y of $D^r$(x+$D^l$(x,y), y) denote an x-axial coordinate and a y-axial coordinate of a pixel of a corresponding event of the second image, respectively.

When the verifier 203a verifies that the intermediate disparity of the event of the first image is equal to the intermediate disparity of the corresponding event of the second image, the event determiner 203b may determine the event of the first image to be a matched event. Conversely, when the verifier 203a verifies that the intermediate disparity of the event of the first image is not equal to the intermediate disparity of the corresponding event of the second image, the event determiner 203b may determine the event of the first image to be an unmatched event.

The disparity predictor 204 may calculate a set $\overline{D}$ of the optimal disparities of all the events of the first image based on Equation 12.

$$\hat{D} = \underset{\hat{D}}{\mathrm{argmin}} \left( \lambda \cdot \sum_{i=1}^{M} (\hat{d}_i - d_i) + (1 - \lambda) \sum_{j=1}^{S} \left( \hat{d}_j - \sum_{m=1}^{K} w_{jm} \cdot d_m \right) \right)$$ [Equation 12]

In Equation 12, λ denotes a linear combination weight, M denotes a total number of matched events of the first image, $d_j$ denotes an intermediate disparity of a matched event i of the first image calculated based on a cost within a preset disparity range, $\hat{d}_i$ denotes an optimal disparity of the matched event i of the first image, S denotes a total number of events of the first image, $\hat{d}_j$ denotes an optimal disparity of an event j of the first image, K denotes a total number of matched events selected near the event j, $d_m$ denotes an intermediate disparity of a matched event m calculated based on the cost within the disparity range, among the selected matched events, $w_{jm}$ denotes a feature similarity between the event j and the matched event m, and $$\underset{\hat{D}}{\mathrm{argmin}} \left( \lambda \cdot \sum_{i=1}^{M} (\hat{d}_i - d_i) + (1 - \lambda) \sum_{j=1}^{S} \left( \hat{d}_j - \sum_{m=1}^{K} w_{jm} \cdot d_m \right) \right)$$

denotes $\hat{D}$ that minimizes $$\lambda \cdot \sum_{i=1}^{M} (\hat{d}_i - d_i) + (1 - \lambda) \sum_{j=1}^{S} \left( \hat{d}_j - \sum_{m=1}^{K} w_{jm} \cdot d_m \right).$$

According to example embodiments, the following effects may be achieved.

(1) A cost within a preset disparity range of an event may be calculated with respect to each event of a left image and a right image acquired using dynamic vision sensors, an intermediate disparity of the event may be calculated based on the cost, and it is determined whether an event of a first image is a matched event based on an intermediate disparity of the event of the first image and an intermediate disparity of a corresponding event of a second image. When the first image corresponds to the left image, the second image may correspond to the right image. When the first image corresponds to the right image, the second image may correspond to the left image. A disparity with respect to the images acquired using the dynamic vision sensors may be calculated by predicting optimal disparities of all events of the first image based on an intermediate disparity of the matched event of the first image. In this example, an event, rather than a pixel, of an image may be processed. Since the number of events is less than the number of pixels, the apparatus for acquiring an image disparity according to an exemplary embodiment may reduce an amount of time and a complexity of calculation required to process all pixels may be solved.

(2) Noise may be removed from a left image and a right image, and each event of the noise-removed left image and the noise-removed right image may be processed to acquire optimal disparities of all events of the first image. By effectively removing invalid events, that is, noise from an image, calculation may be performed with respect to valid events. Thus, a complexity of calculation may be reduced, an amount of time used for calculation may be reduced, and a work efficiency may improve.

(3) A feature descriptor of a pixel of an image may be added to effectively describe a feature of the pixel, and a correspondence between events of left and right images may be established effectively.

(4) By predicting a method of optimal disparities of all events of a first image based on an intermediate disparity of a matched event of the first image, a smooth disparity of an event of the first image may be acquired, and a degree of disparity prediction precision may improve.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa. Moreover, it is understood that in exemplary embodiments, one or more units (e.g., those represented by a block as illustrated in FIGS. 6 and 7) of the above-described apparatuses and devices can include or implemented by circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of acquiring an image disparity by one or more hardware processors, the method comprising:

acquiring, from dynamic vision sensors, a first image having a first view of an object and a second image having a second view of the object;

calculating a cost within a preset disparity range of an event of first image and a corresponding event of the second image, wherein the event of the first image and the corresponding event of the second image are generated when an intensity of lighting is greater than a preset threshold;

calculating an intermediate disparity of the event of the first image and an intermediate disparity of the event of the second image based on the cost;

determining whether the event of the first image is a matched event based on the intermediate disparity of the event of the first image and the intermediate disparity of the event of the second image; and in response to the event of the first image being determined as the matched event, predicting optimal disparities of all events of the first image based on the intermediate disparity of the event of the first image.

2. The method of claim 1, further comprising:
removing noise from the first image to acquire a noise-removed first image.

3. The method of claim 2, wherein the removing comprises:

acquiring $\{\delta_1 u_1 v_1^H, \delta_2 H_2 v_2^H, \ldots, \delta_i u_i v_i^H, \ldots, \delta_r u_r v_r^H\}$ by performing feature decomposition with respect to the first image, $\delta_i$ denoting an i-th eigenvalue, $\delta_1, \delta_2, \ldots, \delta_r$ denoting eigenvalues arranged in descending order, $u_i$ and $v_i^H$ denoting eigenvectors orthogonal to each other, and r denoting a total number of the eigenvalues;

acquiring first to k-th eigenvalues $\delta_1, \delta_2, \ldots, \delta_k$ which are greater than or equal to a preset value, among $\delta_1, \delta_2, \ldots, \delta_r$, k being less than r; and acquiring the noise-removed image based on the following equation:

$$I_0 = \sum_{i=1}^{k} \delta_i u_i v_i^H$$

wherein $I_0$ denotes the noise-removed first image.

4. The method of claim 1, wherein the calculating the cost comprises:

calculating a feature of a pixel of the first image and the second image; and calculating the cost based on the feature of the pixel within a local range of a center point of the first and second images.

5. The method of claim 4, wherein the calculating the feature of the pixel comprises:

calculating the feature of the pixel based on the following equation:

$$F_n(x, y) = \min_i(\text{abs}(x - i) \mid \text{rot}E_n(i, y) \neq 0)$$

wherein $F_n(x,y)$ denotes the feature of the pixel in an n-th direction, x and y denote an x-axial coordinate and a y-axial coordinate of the pixel (x,y), respectively, n denotes a value ranging from 1 to N, N denotes a total number of directions, i≠x is satisfied, $E_n(i,y)$ denotes a polarity of a pixel (i,y) near the pixel in the n-th direction, i denotes an x-axial coordinate of the pixel (i,y), rot denotes a function to rotate, abs denotes a function to obtain an absolute value, and min denotes a function to obtain a minimum value.

6. The method of claim 4, wherein the calculating the cost based on the feature of the pixel within the local range of the center point comprises:

calculating a final cost matrix corresponding to the cost based on the following equation:

$$\begin{cases} C(x, y, d) = \alpha \cdot \sum_{n=1}^{N} CF_n(x, y, d) + (1-\alpha) \cdot CP(x, y, d) \\ CF_n(x, y, d) = \sum_{(x', y') \in W(x,y)} [F_n(x'+d, y') - F_n(x', y')] \\ CP(x, y, d) = [E(x+d, y) - E(x, y)]^2 \end{cases}$$

wherein d denotes a disparity value within a preset disparity range, C(x,y,d) denotes the final cost matrix, $CF_n(x,y,d)$ denotes a feature matching cost, CP(x,y,d) denotes a polarity matching cost, α denotes a linear combination weight, x and y denote an x-axial coordinate and a y-axial coordinate of the pixel (x,y), respectively, W(x,y) denotes the local range of the center point, (x',y') denotes an arbitrary pixel within W(x,y), N denotes a total number of directions, n denotes a value ranging from 1 to N, $F_n(x',y')$ denotes a feature of the arbitrary pixel (x',y') in an n-th direction, $F_n(x'+d,y')$ denotes a feature of a pixel (x'+d,y') in the n-th direction, E(x,y) denotes a polarity of the pixel (x,y), and E(x+d,y) denotes a polarity of a pixel (x+d,y).

7. The method of claim 6, wherein the calculating the intermediate disparity of the event of the first image comprises:

calculating the intermediate disparity of the event of the first image based on the following equation:

$$D(x, y) = \underset{d}{\mathrm{argmin}} C(x, y, d)$$

wherein D(x,y) denotes the intermediate disparity of the event of the first image, and arg min C(x,y,d) denotes d that minimizes C(x,y,d).

8. The method of claim 1, wherein the determining comprises:

verifying whether the intermediate disparity of the event of the first image is equal to the intermediate disparity of the corresponding event of the second image;

determining the event of the first image to be the matched event when the intermediate disparity of the event of the first image is equal to the intermediate disparity of the corresponding event of the second image; and determining the event of the first image to be an unmatched event when the intermediate disparity of the event of the first image is different from the intermediate disparity of the corresponding event of the second image.

9. The method of claim 1, wherein the predicting comprises:

calculating a set of the optimal disparities of all the events of the first image based on the following equation:

$$\hat{D} = \underset{\hat{D}}{\mathrm{argmin}} \left( \lambda \cdot \sum_{i=1}^{M} (\hat{d}_i - d_i) + (1-\lambda) \sum_{j=1}^{S} \left( \hat{d}_j - \sum_{m=1}^{K} w_{jm} \cdot d_m \right) \right)$$

wherein $\hat{D}$ denotes the set of optimal disparities of all the events of the first λ image, denotes a linear combination weight, M denotes a total number of matched events of the first image, $d_i$ denotes an intermediate disparity of a matched event i of the first image calculated based on the cost within the preset disparity range, $\hat{d}_i$ denotes an optimal disparity of the matched event i of the first image, S denotes a total number of events of the first image, $\hat{d}_j$ denotes an optimal disparity of an event j of the first image, K denotes a total number of matched events selected near the event j, $d_m$ denotes an intermediate disparity of a matched event m calculated based on the cost within the disparity range, among the selected matched events, $w_{jm}$ denotes a feature similarity between the event j and the matched event m, and $$\underset{\hat{D}}{\mathrm{argmin}} \left( \lambda \cdot \sum_{i=1}^{M} (\hat{d}_i - d_i) + (1-\lambda) \sum_{j=1}^{S} \left( \hat{d}_j - \sum_{m=1}^{K} w_{jm} \cdot d_m \right) \right)$$

denotes $\hat{D}$ that minimizes $$\lambda \cdot \sum_{i=1}^{M} (\hat{d}_i - d_i) + (1-\lambda) \sum_{j=1}^{S} \left( \hat{d}_j - \sum_{m=1}^{K} w_{jm} \cdot d_m \right).$$

10. The method of claim 1, wherein the second image corresponds to a right image of the object when the first image corresponds to a left image of the object, and the second image corresponds to the left image when the first image corresponds to the right image.

11. An apparatus for acquiring an image disparity, the apparatus comprising one or more hardware processors comprising:

a cost calculator configured to calculate a cost within a preset disparity range of an event of a first image and a corresponding event of a second image, wherein the event of the first image and the corresponding event of the second image are generated when an intensity of lighting is greater than a preset threshold;

a disparity calculator configured to calculate an intermediate disparity of the event of the first image and an intermediate disparity of the event of the second image based on the cost;

a determiner configured to determine whether the event of the first image is a matched event based on the intermediate disparity of the event of the first image and the intermediate disparity of the event of the second image; and a disparity predictor configured to predict optimal disparities of all events of the first image based on the intermediate disparity of the event of the first image, in response to the event of the first image being determined as the matched event.

12. The apparatus of claim 11, wherein the cost calculator comprises:

a noise remover configured to remove noise from the first image to acquire a noise-removed first image.

13. The apparatus of claim 12, wherein the noise remover comprises:
    a decomposer configured to acquire $\{\delta_1 u_1 v_1^H, \delta_2 u_2 v_2^H, \ldots, \delta_i u_i v_i^H, \ldots, \delta_r u_r v_r^H\}$ by performing feature decomposition with respect to the first image, $\delta_i$ denoting an i-th eigenvalue, $\delta_1, \delta_2, \ldots, \delta_r$ denoting eigenvalues arranged in descending order, $u_i$ and $V_i^H$ denoting eigenvectors orthogonal to each other, and r denoting a total number of the eigenvalues;
    an acquirer configured to acquire first to k-th eigenvalues $\delta_1, \delta_2, \ldots, \delta_k$ which are greater than or equal to a preset value, among $\delta_1, \delta_2, \ldots, \delta_r$, k being less than r; and
    an image calculator configured to acquire the noise-removed image based on the following equation:

$$I_0 = \sum_{i=1}^{k} \delta_i u_i v_i^H$$

wherein $I_0$ denotes the noise-removed first image.

14. The apparatus of claim 11, wherein the cost calculator comprises:
    a feature calculator configured to calculate a feature of a pixel of first image and the second image; and
    a cost determiner configured to calculate the cost based on the feature of the pixel within a local range of a center point of the first and second images.

15. The apparatus of claim 14, wherein the feature calculator is configured to calculate the feature of the pixel based on the following equation:

$$F_n(x, y) = \min_i(\text{abs}(x - i) \mid rotE_n(i, y) \neq 0)$$

wherein $F_n(x,y)$ denotes the feature of the pixel in an n-th direction, x and y denote an x-axial coordinate and a y-axial coordinate of the pixel (x,y), respectively, n denotes a value ranging from 1 to N, N denotes a total number of directions, i≠x is satisfied, $E_n(i,y)$ denotes a polarity of a pixel (i,y) near the pixel in the n-th direction, i denotes an x-axial coordinate of the pixel (i,y), rot denotes a function to rotate, abs denotes a function to obtain an absolute value, and min denotes a function to obtain a minimum value.

16. The apparatus of claim 14, wherein the cost determiner is configured to calculate a final cost matrix corresponding to the cost based on the following equation:

$$\begin{cases} C(x, y, d) = \alpha \cdot \sum_{n=1}^{N} CF_n(x, y, d) + (1 - \alpha) \cdot CP(x, y, d) \\ CF_n(x, y, d) = \sum_{(x', y') \in W(x,y)} [F_n(x' + d, y') - F_n(x', y')] \\ CP(x, y, d) = [E(x + d, y) - E(x, y)]^2 \end{cases}$$

wherein d denotes a disparity value within a preset disparity range, C(x,y,d) denotes the final cost matrix, $CF_n(x,y,d)$ denotes a feature matching cost, CP(x,y,d) denotes a polarity matching cost, α denotes a linear combination weight, x and y denote an x-axial coordinate and a y-axial coordinate of the pixel (x,y), respectively, W(x,y) denotes the local range of the center point, (x',y') denotes an arbitrary pixel within, W(x,y) denotes a total number of directions, n denotes a value ranging from 1 to N, $F_n(x',y')$ denotes a feature of the arbitrary pixel (x',y') in an n-th direction, $F_n(x'+d,y')$ denotes a feature of a pixel (x'+d,y') in the n-th direction, E(x,y) denotes a polarity of the pixel (x,y), and E(x+d,y) denotes a polarity of a pixel (x+d,y).

17. The apparatus of claim 16, wherein the disparity calculator is configured to calculate the intermediate disparity of the event of the first image based on the following equation:

$$D(x, y) = \underset{d}{\arg\min} C(x, y, d)$$

wherein D(x,y) denotes the intermediate disparity of the event of the first image, and arg min C(x,y,d) denotes d that minimizes C(x,y,d).

18. The apparatus of claim 11, wherein the determiner comprises:
    a verifier configured to verify whether the intermediate disparity of the event of the first image is equal to the intermediate disparity of the corresponding event of the second image; and
    an event determiner configured to determine the event of the first image to be the matched event when the verifier verifies that the intermediate disparity of the event of the first image is equal to the intermediate disparity of the corresponding event of the second image, and determine the event of the first image to be an unmatched event when the verifier verifies that the intermediate disparity of the event of the first image is different from the intermediate disparity of the corresponding event of the second image.

19. The apparatus of claim 11, wherein the disparity predictor is configured to calculate a set of the optimal disparities of all the events of the first image based on the following equation:

$$\hat{D} = \underset{\hat{D}}{\arg\min}\left(\lambda \cdot \sum_{i=1}^{M}(\hat{d}_i - d_i) + (1 - \lambda)\sum_{j=1}^{S}\left(\hat{d}_j - \sum_{m=1}^{K} w_{jm} \cdot d_m\right)\right)$$

wherein $\hat{D}$ denotes the set of optimal disparities of all the events of the first image, λ denotes a linear combination weight, M denotes a total number of matched events of the first image, $d_i$ denotes an intermediate disparity of a matched event i of the first image calculated based on the cost within the preset disparity range, $\hat{d}_i$ denotes an optimal disparity of the matched event i of the first image, S denotes a total number of events of the first image, $\hat{d}_j$ denotes an optimal disparity of an event j of the first image, K denotes a total number of matched events selected near the event j, $d_m$ denotes an intermediate disparity of a matched event m calculated based on the cost within the disparity range, among the selected matched events, $w_{jm}$ denotes a feature similarity between the event j and the matched event m, and $$\underset{\hat{D}}{\operatorname{argmin}}\left(\lambda \cdot \sum_{i=1}^{M}\left(\hat{d}_{i}-d_{i}\right)+(1-\lambda) \sum_{j=1}^{S}\left(\hat{d}_{j}-\sum_{m=1}^{K} w_{jm} \cdot d_{m}\right)\right)$$

denotes $\hat{D}$ that minimizes $$\lambda \cdot \sum_{i=1}^{M}\left(\hat{d}_{i}-d_{i}\right)+(1-\lambda) \sum_{j=1}^{S}\left(\hat{d}_{j}-\sum_{m=1}^{K} w_{jm} \cdot d_{m}\right).$$

\* \* \* \* \*